United States Patent [19]

Kaumeyer

[11] Patent Number: 5,480,688
[45] Date of Patent: Jan. 2, 1996

[54] SHAPED FLEXIBLE DECORATIVE ARTICLES AND METHOD FOR MAKING SAME

[75] Inventor: Michael W. Kaumeyer, Lancaster, Ohio

[73] Assignee: The Auld Company, Columbus, Ohio

[21] Appl. No.: 258,931

[22] Filed: Jun. 13, 1994

[51] Int. Cl.⁶ .................................................. B60R 13/04
[52] U.S. Cl. ..................... 428/13; 52/716.5; 293/128; 428/31
[58] Field of Search ...................... 428/13, 31; 52/716.5; 293/128

[56] References Cited

U.S. PATENT DOCUMENTS

| | | | |
|---|---|---|---|
| 4,259,388 | 3/1981 | Reed | 428/28 X |
| 4,292,827 | 10/1981 | Waugh | 428/31 X |
| 4,356,617 | 11/1982 | Coscia | 428/13 X |
| 4,446,179 | 5/1984 | Waugh | 428/31 |
| 4,556,588 | 12/1985 | Rockwood | 428/13 |
| 4,566,929 | 1/1986 | Waugh | 428/31 X |
| 4,781,952 | 11/1988 | Coscia et al. | 428/31 |
| 4,801,479 | 1/1989 | Fielder et al. | 428/31 |
| 4,877,657 | 10/1989 | Yaver | 428/31 |

*Primary Examiner*—Henry F. Epstein
*Attorney, Agent, or Firm*—Killworth, Gottman, Hagan & Schaeff

[57] ABSTRACT

Shaped, flexible decorative emblems and a method for making the same are provided. The decorative emblems comprises a substrate layer having a decorative pattern thereon, a plastic lens cap, and an adhesive layer protected by a release liner. The decorative emblems are formed in the non-planar shape corresponding to the shape of the desired application surface. The method for making the non-planar decorative emblem involves casting the plastic lens cap on the substrate surface while the substrate is held substantially flat, subject the plastic to an initial cure while still flat, molding the emblem to a mandrel formed in the desired non-planar shape and subjecting the shaped emblem to a final cure to fix the emblem in the non-planar shape.

5 Claims, 2 Drawing Sheets

SHAPED FLEXIBLE DECORATIVE ARTICLES AND METHOD FOR MAKING SAME

BACKGROUND OF THE INVENTION

The present invention relates to shaped decorative articles and a method for making them. More particularly, the invention relates to a process in which a fluent plastic composition is cast onto a substrate and then cured in a desired shape or pattern and the article produced by test process.

Decorative articles and emblems of various configurations have been used in various industries such as the automotive industry. Emblems of various shapes have been used for decorative purposes and to display trademarks and logos. Trim strips such as elongated flexible body side molding, have been used to both decorate and protect automobile body surfaces. In recent years, emphasis has been placed on the use of decorative plastic articles which do not corrode and which can be adhesively attached without fasteners. In most instances such decorative articles, emblems or trim strips are designed for attachment to a relatively flat surface.

A decorative article which is formed in its desired three-dimensional shape for attachment to a non-planar surface is highly desirable to various industries. Application of decorative articles to non-planar surfaces, i.e. those with curves or bends, places more stress upon the article. Flat articles must be molded to fit non-planar surfaces. As the article is planar and not formed in the desired shape, it maintains a desire to return to its original flat, planar shape. This desire places additional stress upon the adhesive used hold the emblem in place and leads to a shortened lifetime of the article.

A decorative emblem with a plastic lens cap on the surface is also desired by various industries. The application of a lens cap improves the appearance and weatherability of the emblem. Trim strips and decorative articles comprising a substrate with a cast plastic lens cap formed thereon have been known. U.S. Pat. No. 4,446,179 to Waugh discloses decorative trim strips which consist of a uniform, flat, elongated foil substrate having a plastic lens cap cast thereon. The trim strip formed is of a constant width, flat and elongated. U.S. Pat. No. 4,781,952 to Coscia et al discloses decorative articles that are elongated yet not uniform. They vary in width or direction along the length. They are, however, also flat. U.S. Pat. No. 4,801,479 to Fielder again discloses a decorative article that is elongated yet not uniform along the length. All three references have in common the method of forming in that the substrate is held flat and horizontal through the entire casting and curing period. Thus, the formed article is flat, yet flexible enough to be bent to a final curved application. None of the references disclose a non-flat article which is cured in the shape required for its final application and which has a memory of the required shape.

That is because non-planar flexible decorative articles with a plastic lens cap of the type disclosed in the above-referenced patents have previously been improbable. The plastic lens cap must be applied to a planar surface which is held flat and horizontal so that the fluent plastic flows to the sharply defined effective edges, domes up, and uniformly covers the whole decorative surface which the lens is intended to enhance. If the lens cap is not applied in a substantially uniform fashion, distortions of the emblems image may occur. Thus, the production of non-planar emblems containing a plastic lens cap has previously been undesirable.

U.S. Pat. No. 4,292,827 to Waugh discloses a decorative, domed article or emblem that is curved in final form. The curved article is formed from a stiff metal foil substrate such as an aluminum foil. The plastic cap is formed on the substrate as the substrate is held flat and horizontal. The substrate is then cured in the same flat, horizontal position. The curved shape is formed by punching the article out from the foil sheet. The force of the punch imparts a slight curve to the final article. However, as the substrate is a stiff metalized foil and the plastic composition a relatively hard one, the article is relatively inflexible. Thus, its ability to be formed to imperfections on the surface or in the shape is significantly reduced. Further, the article has no memory for its original slightly curved final form. Once the article has been forced out of that form, it will not readily spring back into the curved form.

Accordingly, a need remains for a flexible decorative article with a plastic lens cap cast thereon that is formed in its desired three-dimensional, non-planar end shape thereby enhancing its usefulness in application. Further, there remains a need for such a shaped decorative article which has a memory of its original shape.

SUMMARY OF THE INVENTION

The present invention solves this need by providing a three-dimensional shaped non-planar flexible decorative article and a method for making the same. The article of the present invention is provided in the desired non-planar shape of the surface which the article is to be applied. Thus, many of the disadvantages of the prior art are avoided. The shaped article of the present invention adheres well to the surface on which it is applied. The article is flexible to be molded to imperfections or non-uniformities in the application surface. Further, it remembers the original shape in which it is formed so that if during application the article is bent or the shape is changed, it will readily return to the desired shape.

In accordance with the present invention, such a shaped decorative article is provided. The shaped article comprises a flexible plastic substrate with a plastic lens cap applied on at least one surface of the substrate. The article has a non-planar shape corresponding to the non-planar surface to which the article is to be applied. The substrate has sharply defined edges serving as effective edges. Preferably, the plastic substrate is a polyester film and has a decorative pattern on the surface upon which the lens cap is cast. Additionally, the substrate may be a disk and the desired non-planar shape convex.

The plastic lens cap is cast on and integral to the surface of the substrate. The plastic lens cap actually enhances the decorative pattern on the substrate surface when viewed through the lens cap. Preferably, the plastic cap is a flexible abrasion resistant polyurethane. To enhance the lifetime of the plastic lens cap, a UV absorbing compound and a antioxidant compound may be added to the polyurethane composition.

The shaped article can further include a layer of adhesive material on the side of the substrate opposite to the side on which the plastic lens cap is cast. The adhesive material is used to apply the emblem to the desired surface without fasteners. Thus, the adhesive is desirably a pressure sensitive adhesive. To protect the adhesive layer until the emblem is applied, the article may also be provided with a release liner.

In this fashion the emblem may be peeled off and applied to the desired surface.

In accordance with an additional aspect of the present invention, a method for producing shaped decorative articles is provided. The method comprises first providing a flexible substrate, preferably a plastic such as polyester film, having sharply defined effective edges formed thereon. The effective edge can be formed by cutting the edges of the substrate.

A plastic lens cap is then formed upon the substrate. The lens cap is formed by casting a fluent plastic composition on the substrate. While the plastic composition is cast the substrate is held substantially flat and horizontal. The plastic composition flows to the effective edge on the substrate an forms a positive meniscus. Preferably, the plastic composition is a fluent, abrasion-resistant polyurethane. An antioxidant and UV absorber may be added to the plastic composition in order to prolong the lifetime of the lens cap.

After the lens cap is cast and while the substrate is still being held substantially flat and horizontal, the plastic composition is subjected to an initial cure. The initial cure is conducted until the plastic has just cured sufficiently to be self-sustaining, yet moldable. Preferably, the initial cure time is from 3 to 7 minutes.

After the initial cure has been completed, the substrate and lens cap is formed into a non-planar shape. The forming is completed by molding the substrate and lens cap against a shaped mandrel. The mandrel is shaped in the desired non-planar shape so that the substrate and lens cap assumes the non-planar shape when molded against the mandrel.

Once the substrate and lens cap have been molded they are subjected to a final cure. The final cure is used to completly cure the lens cap and fix the emblem in the molded shape. Preferably, the final cure is a post-bake conducted for from 8 to 10 hours from about 120° F. to about 140° F. In order to assure the proper shape, the final cure can be performed while the substrate and lens cap are still molded to the shaped mandrel. Once cured, the lens cap becomes integral to substrate and provides a lens effect over the substrate. That is, the lens cap actually enhances the quality of any image disposed on the substrate surface.

The process of the present invention may further comprise providing a layer of adhesive material on the substrate surface opposite to the surface on which the lens cap is cast. The adhesive is preferably a pressure sensitive adhesive. Also, the adhesive layer is protected by a release liner until such time as the emblem is to be applied. Generally, the adhesive layer and release liner are applied to the substrate before the effective edge is provided.

Accordingly, it is an object of the present invention to provide a three-dimensional, shaped, non-planar flexible decorative emblems. It is a feature of the present invention to provide such a shaped, flexible decorative emblem having an integral plastic lens cap formed thereon. It is still further a feature of the present invention to provide a method for producing three-dimensional shaped non-planar flexible decorative emblems comprising casting an integral lens cap on the substrate, subjecting the emblem to an initial cure to hold the plastic in place, forming the emblem in the desired non-planar shape and subjecting the formed emblem to a final cure to completely cure the plastic lens cap. It is an advantage of the present invention that three-dimensional shaped, non-planar flexible decorative emblems are provided which increase ability to adhere to an application surface than do substantially flat decorative emblems. Other objects, features and advantages of the present invention will be apparent from the following description, the accompanying figures, and the claims.

DETAILED DESCRIPTION OF THE PREFERRED EMBODIMENTS

The present invention comprises three-dimensional shaped non-planar flexible decorative emblems and a method for making them. The emblems have a flexible plastic lens cap on a substrate having a decorated surface. The lens cap not only preserves the decorated surface of the emblem but actually enhances the appearance of the decorated surface as viewed through the lens cap. The emblem and method of the present invention will be further described by reference to the accompanying figures.

Figure 1:
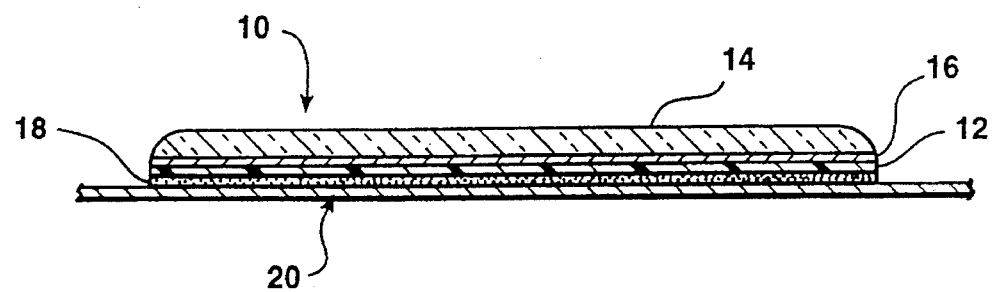
FIG. 1 is a cross-sectional view showing the various layers of the preferred emblem of the present invention taken along line 1—1 in FIG. 2.

Referring to FIG. 1, although the layers are exaggerated for purposes of clarity, there is seen a cross-sectional view of the emblem of the present invention. The emblem 10 comprises a substrate 12 and a plastic lens cap 14. The substrate must be a flexible film so that the emblem can be easily molded. The film should be less than or equal to 0.010 inch, preferably less than or equal to 0.005 inch. The substrate film may be a metal film such as aluminum, a plastic such as polyethylene (e.g. Mylar film), polyvinyl chloride or the like or the film may be paper based.

The substrate 12 may have a decorative pattern 16 provided on the surface on which the lens cap is to be cast. The decorative pattern may be applied by printing, silk-screening, painting or tinting. The decorative pattern may include designs, lettering or solids such as colors or reflective surfaces.

Emblem 10 also may include an adhesive layer 18. The adhesive allows emblem 10 to be applied without fasteners to a application surface. Adhesive layer 18 is provided on the surface of substrate 12 opposite the surface on which the decorative pattern 16 and lens cap 14 are to be applied. The adhesive material used is preferably a pressure sensitive adhesive, such as one of the pressure sensitive acrylic adhesives from 3M of St. Paul, Minn., although the pressure sensitive adhesive chosen is not critical to the present invention. Adhesive layer 18 is preferably from 0.002 to 0.005 inch thick.

Adhesive layer 18 is protected by release liner 20. Release liner 20 is designed such that adhesive layer 18 is protected and emblem 10 is easily removed for application. Various release liners are known and may be employed. Preferably, release liner 20 is a polyester carrier sheet having a silicon release agent provided over one surface. Such a release liner is generally available from Flexcon, Inc. of Spenser, Mass. Release liner 20 is preferably 0.003 to 0.007 inch thick, and most preferably 0.003 inch.

The plastic lens cap 14 is a thermoplastic material which is weather-resistant and does not yellow or cloud as a result of prolonged exposure to light and which withstands strong detergent. The plastic should also be resistant to abrasion, impact, scratching and tearing. A number of plastics may be used for this purpose, but one which is particularly advantageous because it satisfies all the above needs is an impact and abrasion resistant, clear, flexible polyurethane. One polyurethane useful in the present invention is the reaction product of polypropylene glycol and an aliphatic diisocyanate.

In one embodiment, a relatively soft, flexible, water-resistant polyurethane generally characterized by a Shore A hardness in the range of approximately 75 to approximately 95 and preferably approximately 85 to approximately 95, a specific gravity in the range of approximately 1.02 to approximately 1.08, preferably approximately 1.06, and a gel time in the range of approximately 4 to approximately 7 minutes, preferably approximately 5 minutes is used. Such polyurethanes are known and various ones can be used in the present invention. One that is particularly useful is the reaction product of (A) a mixture of a polyester glycol and low to medium molecular weight polypropylenetriols and (B) an aliphatic diisocyanatepolypropylenetriol adduct.

Preferably, a suitable catalyst is added to the "A" component to aid in curing. The catalyst added is generally a heavy metal catalyst such as zinc, lead, tin, mercury, bismuth or combinations thereof. The addition of the catalyst promotes a slow cure at room temperature so as to allow full flow of the liquid polyurethane to the edges of the substrate before setting.

Prolonged exposure to sunlight may fade or damage the decorative pattern 16 on the surface of substrate 12. Although the plastic lens cap by itself will repel an amount of UV radiation thereby prolonging the life of the substrate surface, preferably a UV absorbing compound is added to component "A" of the reaction mixture. The presence of an UV absorber further reduces the amount of harmful radiation which reaches the substrate surface. Suitable UV absorbers include benzothenone UV screeners. A typical benzothenone UV screener is available under the tradename TINUVUN is available from Ceba-Geigy Corp. of Ardsly, N.Y.

Additionally, the plastic lens cap also preferably contains an antioxidant compound. An antioxidant aids in preventing the plastic lens cap from yellowing or discoloring with age and, thus, prolongs the life of the substrate. Suitable antioxidants for the present invention include hindered amines. A typical hindered amine useful in the present invention is available under the tradename IRGANOX and is available from Ceba-Geigy Corp. of Ardsly, N.Y.

Emblem 10 of the present invention is a three-dimensional shaped, non-planar flexible decorative emblem. Emblem 10 is manufactured so as to approximate the non-planar shape of the eventual application surface. The emblem may be molded into generally any non-planar shape such as curves, twists or the like provided that the bend or curve is not so sharp as to break the substrate or initially cured lens cap or the bond between them. As both the substrate and plastic lens cap employed are flexible, the emblem 10 is consequently flexible and can be formed to imperfections in the application surface. Further, due to the formation of emblem 10 in the desired non-planar application shape, the amount of stress placed upon adhesive layer 18 once emblem 10 is applied to the application surface is greatly reduced. Thus, the useful application lifetime of emblems of the present invention is increased due to a reduction in failures of the adhesive layer to adhere to the application surface.

A method for preparing the emblem of the present invention is illustrated in FIGS. 2–5. The method typically involves providing a substrate sheet of polyester film. An acrylic adhesive is then applied to the bottom surface of the polyester substrate followed by bonding to a polyester release liner. Preferably, the polyester substrate is 0.002 inch, the acrylic adhesive layer 0.002 inch and the release liner 0.003 inch thick.

The assembly of substrate, adhesive and release liner is then printed, preferably with a silk screening technique, to provide a series of decorative patterns on each sheet of substrate film. Before casting of the plastic composition, the edges of the substrate should preferably have a clean or sharp cut edge to create an effective edge. By effective edge it is intended to mean one that will create sufficient surface tension to create a positive meniscus effect on the edges of the substrate with the plastic composition.

The effective edge is provided in the preferred method by passing the printed assembly through a kiss-cut process in registry with the decorative patterns. In the kiss-cut process, a sharply defined edge is cut through the substrate and adhesive layers around the perimeter of each of the printed patterns on the assembly. The cut does not, however, penetrate the release liner sheet. By removing the selvage of substrate, a series of discrete emblem-shaped substrates having a decorated surface are provided on the release liner.

Once the effective edge has been provided, the lens cap 14 is cast on the substrate surface. The substrate surface on which the lens cap is to be cast should be free from moisture, grease, dust and other foreign matter. The assembly preferably should be held substantially flat and horizontal. A substantially flat or level surface allows for a smooth, even distribution of plastic composition over the substrate surface. The substrate can be held flat and horizontal by any suitable means, such as, for example, by means of a vacuum being created underneath the assembly.

The plastic composition is cast onto the substrate surface as a fluent, liquid composition from a casting head. The casting head can be any known head suitable for such a purpose. Examples of a suitable casting head of the present invention include a single nozzle capable of moving in two axes so as to completely coat the substrate surface or multiple nozzles covering the entire substrate surface area. The flow of plastic composition from and location of the nozzle or nozzles, can be effected either manually or automatically operated. A suitable casting head and apparatus can be found in U.S. Pat. No. 4,356,617 to Coscia, the disclosure of which is herein incorporated by reference.

The plastic composition can be applied to the surface by casting, flow coating or any like means. Preferably, the plastic composition is cast by pouring from multiple nozzles and flow coated over the surface to completely coat the substrate surface to a thickness of approximately 0.040 inch to approximately 0.080 inch, and preferably 0.060 inch. In the case of the preferred polyurethane material, the reactive components (i.e. the polyol component and the diisocyanate component) are typically held separate and then mixed at the casting head immediately before being cast onto the substrate surface. The reactive components are typically mixed at elevated temperatures in the range of from 90° to 120° F., preferably 105° F.

To enhance the smooth even surface appearance, the component parts of the preferred urethane should be mixed carefully in the casting head such that no air is entrapped in the composition. Component "A" and component "B" are preferably mixed in a 1:1 ratio. Entrapped air forms bubbles that will cause imperfections in the lens cap. Preferably the components "A" and "B" are degassed before mixing to ensure that air bubbles do not become entrapped. This is done by drawing a good vacuum on the material, releasing the vacuum, drawing another vacuum and releasing the vacuum again. The compound should be degassed then mixed and cast within the aforementioned gel time.

As the plastic composition is cast, the composition flows to the effective edge of the substrate where the surface tension forces create a positive meniscus, i.e. a curved edge. This positive meniscus at the edge provides the lens effect to the lens cap. This lens effect enhances the appearance of the decorative pattern. A sharp, smooth cut is generally sufficient to create the desired effective edge.

Once cast, the plastic material is clear and increases the clarity and enhances the details of the decorative pattern. Since the lens cap is cast as liquid directly onto the surface of the substrate, the lens cap is integral to the substrate surface. That is, the lens cap and substrate surface form one layer. Any imperfections in the surface of the substrate are actually "filled" by the liquid plastic. There are no intermediate spaces or layers such as adhesives. Nor is the lens cap easily removable from the substrate surface. The lens cap can be tinted with various colors, but excellent results are obtained with the clear cast which contrasts with the decorative patterns.

Figure 2:
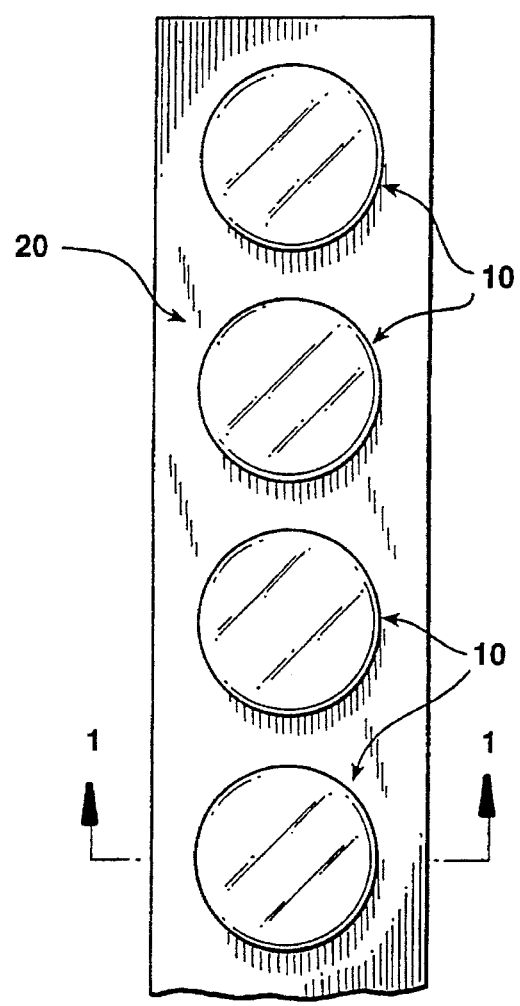
FIG. 2 is a top view of emblems of the present invention after being subjected to the initial cure step.

Once the plastic lens cap has been cast, it is subjected to an initial or controlled cure while the assembly is still being held substantially flat and horizontal as shown in FIG. 2. As can be seen in FIG. 2, emblems 10 are held to release liner 20 in a substantially flat, horizontal position. The initial or controlled cure is conducted until a period of time in which the cast plastic composition gels or becomes formable. That is, the initial or control cure is one which allows the cast plastic composition to become sufficiently self-sustaining to be workable or formable, but is it not a complete cure in which the plastic composition becomes set. The initial or controlled cure generally corresponds to the gel time of the composition of from approximately 3 to approximately 7 minutes, and preferably 5 minutes.

Once the initial or control cure is completed, the assembly is molded against a mandrel shaped in the non-planar shape of the application surface for the emblem. This forms the emblem into the same non-planar shape as the application surface. The desired non-planar shape may be any non-planar shape which includes a bend or curve. The bend or curve must not be so severe so as to break or crack the substrate, the lens cap or the bond between them as the assembly is molded against the shaped mandrel. Thus, sharp turns are not practical for the emblems of the present invention. If a sharp turn is present in the application surface, the emblem must be formed as a curve as close as possible to the desired shape, completely cured, then applied.

Figure 3:
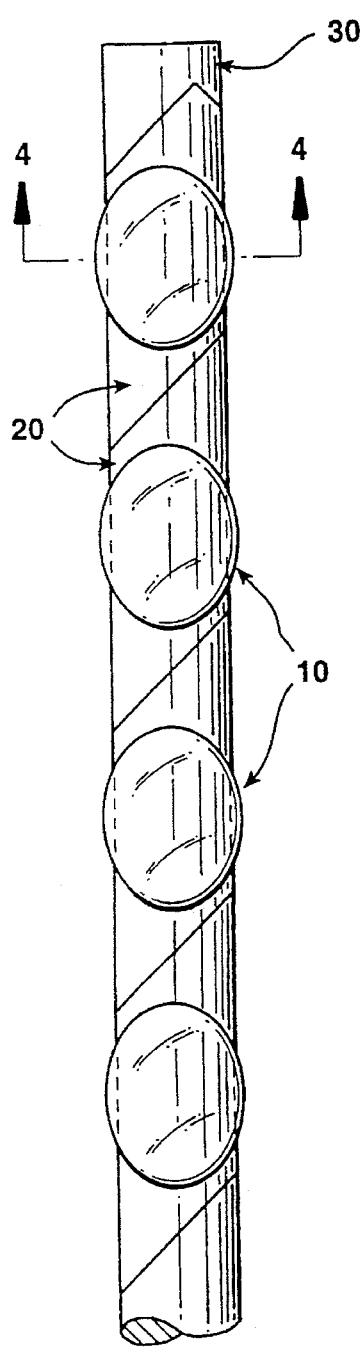
FIG. 3 is a top view of emblems of the present invention molded to a shaped mandrel.
Figure 4:
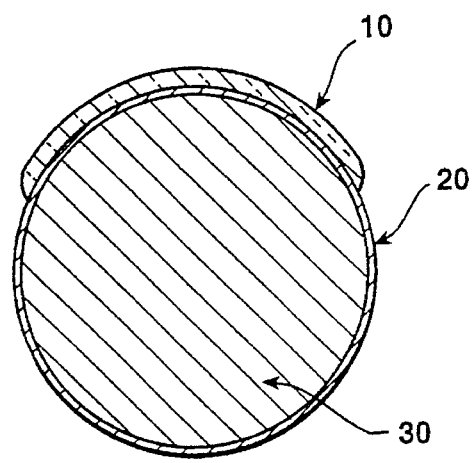
FIG. 4 is a cross-sectional view of an emblem of the present invention molded to a shaped mandrel along line 4—4 in FIG. 3.

As previously stated, the emblem assembly is molded to a shaped mandrel to provide a non-planar shape equivalent to the application surface. FIG. 3 shows a representation of the formation of convex disks according to the present invention. Emblems 10 supported on release liner 20 are molded against a shaped mandrel 30. The emblems 10 are completely molded against the mandrel shape as shown in FIG. 4. FIG. 4 shows a cross-section through shaped mandrel 30 with an emblem 10 molded against the mandrel. Obviously, the size and shape of both the emblem and mandrel can vary with various applications.

Once the emblem assembly has been molded against the shaped mandrel 30, the emblem assembly is subjected to a final cure in order to completely cure the plastic composition and set the emblem 10 in the non-planar shape. The final cure is preferably conducted while the emblem assembly is still molded against the shaped mandrel. This assures that the emblem 10 will be set in the proper non-planar shape. The final cure is preferably a post bake conducted within the range of approximately 110° F. to approximately 145° F., preferably approximately 120° F., for approximately 6 to approximately 12 hours, preferably approximately 8 hours.

Figure 5:
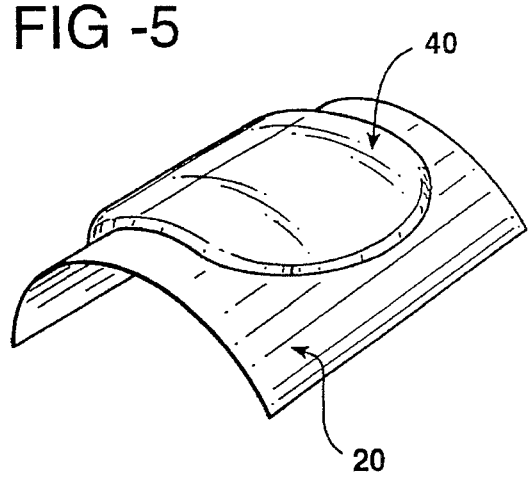
FIG. 5 is a perspective view of the shaped emblem of the present invention.

The final emblem of the present invention is fixed in the non-planar shape as is shown in FIG. 5. FIG. 5 illustrates a final non-planar shaped emblem 40, attached to release liner 20. Although fixed in the non-planar shape, the substrate is sufficiently flexible to allow the emblem 40 to be molded to any surface on which it is applied. This allows for imperfections in the manufacture of the application surface or application to a surface not originally intended for. Unlike prior art emblems, the emblem of the present invention maintains a memory of the non-planar shape in which it is formed. That is, the emblem will return to that original shape if removed or if the shape is changed during application or shipping. As since, the three-dimensional shaped, non-planar emblem of the present invention is ideal for applying logos to a tubular bicycle frame or a curved fender of a bicycle or motorcycle. When the decorative surface is a reflective one, the emblem may be used not only on fenders of bicycles and motorcycles but also on lamp posts and other curved surfaces to which it is desirable to apply reflective emblems.

Having described the invention in detail and by reference to the preferred embodiments thereof, it will be apparent that modifications and variations are possible without departing from the scope of the invention defined in the appended claims.

What is claimed is:

1. A three-dimensional shaped non-planar decorative article comprising:

a flexible plastic substrate having sharply defined effective edges;

a cured plastic cap cast on and integral to said substrate, said cap providing a lens effect over said substrate;

said cured plastic cap being a flexible, abrasion resistant polyurethane;

a layer of adhesive material on the side of said substrate opposite to the side upon which said plastic cap is cast; and said substrate and said cap having a substantially non-planar shape.

2. The three-dimensional shaped non-planar decorative article of claim 1 wherein said substrate is a disk, and said non-planar shape is convex.

3. The three-dimensional shaped non-planar decorative article of claim 1 wherein said flexible, abrasion resistant polyurethane further contains a UV absorbing compound and an antioxidant compound.

4. The three-dimensional shaped non-planar decorative article of claim 1 wherein said layer of adhesive material is protected by a release liner.

5. The three-dimensional shaped non-planar decorative article of claim 1 wherein said substrate is provided with a decorative pattern on the surface upon which cured plastic cap is cast.

* * * * *